United States Patent
Lenda et al.

(10) Patent No.: US 7,402,537 B1
(45) Date of Patent: Jul. 22, 2008

(54) AIR PERMEABLE, WATER REPELLENT, ACOUSTIC DOOR WATERSHIELD

(75) Inventors: Steven E. Lenda, Sterling Heights, MI (US); Donald P. Marriott, Rochester Hills, MI (US)

(73) Assignee: Creative Foam Corporation, Fenton, MI (US)

( * ) Notice: Subject to any disclaimer, the term of this patent is extended or adjusted under 35 U.S.C. 154(b) by 0 days.

(21) Appl. No.: 10/738,930

(22) Filed: Dec. 17, 2003

(51) Int. Cl.
*B32B 5/24* (2006.01)
*B32B 5/26* (2006.01)
*B32B 5/12* (2006.01)
*B32B 27/04* (2006.01)

(52) U.S. Cl. .............. 442/50; 442/56; 442/57; 442/58; 442/85; 442/88

(58) Field of Classification Search .............. 442/50, 442/57, 58, 85, 88, 56
See application file for complete search history.

(56) References Cited

U.S. PATENT DOCUMENTS

| | | | |
|---|---|---|---|
| 4,078,100 A * | 3/1978 | Doerfling | 427/314 |
| 4,608,298 A * | 8/1986 | Klaff | 428/102 |
| 5,149,576 A * | 9/1992 | Potts et al. | 428/198 |
| 5,298,694 A * | 3/1994 | Thompson et al. | 181/286 |
| 5,322,722 A * | 6/1994 | Rozenberg | 428/40.1 |
| 5,459,291 A | 10/1995 | Haines et al. | |
| 5,536,556 A * | 7/1996 | Juriga | 428/138 |
| 5,631,074 A | 5/1997 | Herlihy, Jr. | |
| 5,688,157 A | 11/1997 | Bradley et al. | |
| 5,695,849 A | 12/1997 | Shawver et al. | |
| 5,773,375 A | 6/1998 | Swan et al. | |
| 5,824,973 A | 10/1998 | Haines et al. | |
| 5,997,989 A | 12/1999 | Gessner et al. | |
| 6,102,465 A | 8/2000 | Nemoto et al. | |
| 6,156,682 A | 12/2000 | Fletemier et al. | |
| 6,177,370 B1 | 1/2001 | Skoog et al. | |
| 6,244,378 B1 | 6/2001 | McGrath | |
| 6,268,302 B1 | 7/2001 | Ofosu et al. | |
| 6,296,075 B1 | 10/2001 | Gish et al. | |
| 6,364,976 B2 | 4/2002 | Fletemier et al. | |
| 6,372,172 B1 | 4/2002 | Sudduth et al. | |
| 6,528,437 B1 | 3/2003 | Hepfinger et al. | |
| 2003/0008581 A1 * | 1/2003 | Tilton et al. | 442/181 |
| 2003/0032357 A1 | 2/2003 | Gillespie et al. | |

* cited by examiner

*Primary Examiner*—Ula C Ruddock
(74) *Attorney, Agent, or Firm*—Young Basile

(57) ABSTRACT

A method and apparatus for manufacturing an air controllably permeable, water repellent, acoustic absorbing door water shield for attachment to a vehicle door. The water shield is formed of a first layer constructed of a water repellant, air restrictive non woven scrim which is joined to a second layer formed of a lofted, non-woven fiber pad. The first layer has an air permeability greater than zero. Varying the characteristics of the first and second layers optimizes the acoustic absorption range of the door water shield.

19 Claims, 2 Drawing Sheets

AIR PERMEABLE, WATER REPELLENT, ACOUSTIC DOOR WATERSHIELD

BACKGROUND

The present invention relates to door watershields that prevent water, sound, and dirt from entering into the vehicle passenger compartment.

Door watershields are made of a broad range of materials including stamped sheet metal, injection molded rigid polymer, and resilient closed cell foamed and non-foamed polymers. The watershields also may be combined with other acoustic materials within the trim panel to door cavity to provide sound attenuation in the vehicle passenger compartment.

Typically, prior door watershields were formed of a substantially solid non-porous sheet of non-water and non-air permeable polymeric material. Non-porous polymeric materials provide sound attenuation as a barrier by which reflects sound waves in direct proportion to their mass. However, a preferred sound attenuation method is by absorption, due to the lower mass or sound absorption materials. Sound absorption typically was provided by separate open cell foamed pads or fibrous pads fixed to selected portions of the polymeric sheet or trim panel. These absorbers were protected by the watershield from absorbing water.

It is known that typical acoustic absorber pad materials, such as open-cell foams and fibers, perform more effectively in response to an increase in thickness. However, it is believed that these absorbers can be further improved in sound absorption capability.

Combinations of polymeric sheets and fiber elements have also been used for various sound and water blocking areas of a vehicle, such as a dashboard pad in a vehicle passenger compartment. One such composition uses a polyethylene film and a lofted, non-woven microfiber pad sold commercially under the Thinsulate trademark by 3M.

It is also known that fabrics can be manufactured which are air permeable and non-water permeable for use in outdoor clothing, outdoor covers, etc Such fabrics can be formed of a non-woven fabric or web in which a structure of individual fibers or threads are interlaid in an unidentifiable pattern. Non-woven fabrics or webs can be formed by a number of different processes, such as spun-bonding and meltblowing. Spun bond fibers are small diameter, long strand length fibers, which are formed of extruded molten plastic material. Meltblown fibers can also be formed by extruding the molten plastic material through a die into a high velocity gas stream which attenuates the filaments and reduces their diameter. The meltblown fibers are then carried by the high velocity gas stream and deposited on a collecting surface so as to form a web of randomly dispersed meltblown fibers.

In a vehicle, it is important for occupant comfort that car component and exterior noise be attenuated, as much as possible, before entering the passenger compartment. Such noise spans a range of frequencies, such as 500-20,000 Hz, with engine, tire and road noise generally falling on the low end of the frequency spectrum in the 500-5,000 Hz frequency range and track squeal generally having substantially higher frequencies at the upper end of the defined frequency range.

When compared to more conventional methods of sound attenuation, it is preferable from a cost, weight and accosting performance perspective to provide an air permeable, water repellent, acoustic door watershield which is capable of blocking water and dirt ingress into a vehicle passenger cabin while at the same time attenuating noise over the broad frequency range of noise experienced in a vehicle. It would also be desirable to provide an air permeable, water repellent, acoustic door watershield in which the watershield can be easily conformed to vehicle door shapes and, further in which targeted acoustic performance and hydrophobicity can be optimized by selecting the air permeability of the door watershield.

SUMMARY

The present invention is an air permeable, water repellent, acoustic door shield for mounting on a vehicle door. In one aspect of the invention, a method is disclosed for forming a door watershield mountable in a vehicle door panel.

The method comprises the step of joining a first layer of an air restrictive but permeable, hydrophobic, fluid repellant material, to a second layer of a lofted, non-woven fiber pad.

In this aspect, the first layer has air permeability greater than zero.

In another aspect, the air permeability of the first layer and the second layer is coordinated to optimize sound absorption.

The first layer may be formed of a controlled permeability non-woven scrim, which can be, but not limited to, a single or multiple layer combinations of melt blown or spun bonded polymeric fibers. Polymeric apertured films may also provide controlled air permeability. The second layer may be formed of a lofted, polymeric fiber such as polyester or polypropylene, non-woven pad; natural fiber such as cotton pad; or open celled polymeric foam pad.

In one aspect, the first layer has an air permeability greater than zero. The air permeability of the first layer may be coordinated with the air permeability of the second layer to optimize sound absorption.

Chemical agents may be applied to an outer surface of the first layer to increase hydrophobicity.

The vehicle door watershield and method of making the same according to the present invention provides a unique unitary door watershield which provides the desirable features of air permeability, water repellance and an acoustic absorber in one product, over a wide range of frequencies, in the range of about 500 to about 20,000 Hz. The door watershield is formable to the door panel or inner trim panel shape. Varying the orientation, diameter, thickness, and/or mass/area of the fibers of both the first layer and the second layer may coordinate the air permeability of the first and second layers.

BRIEF DESCRIPTION OF THE DRAWING

The various features, advantages and other uses of the present invention become more apparent by referring to the following detailed description and drawing in which.

DETAILED DESCRIPTION

Figure 1:
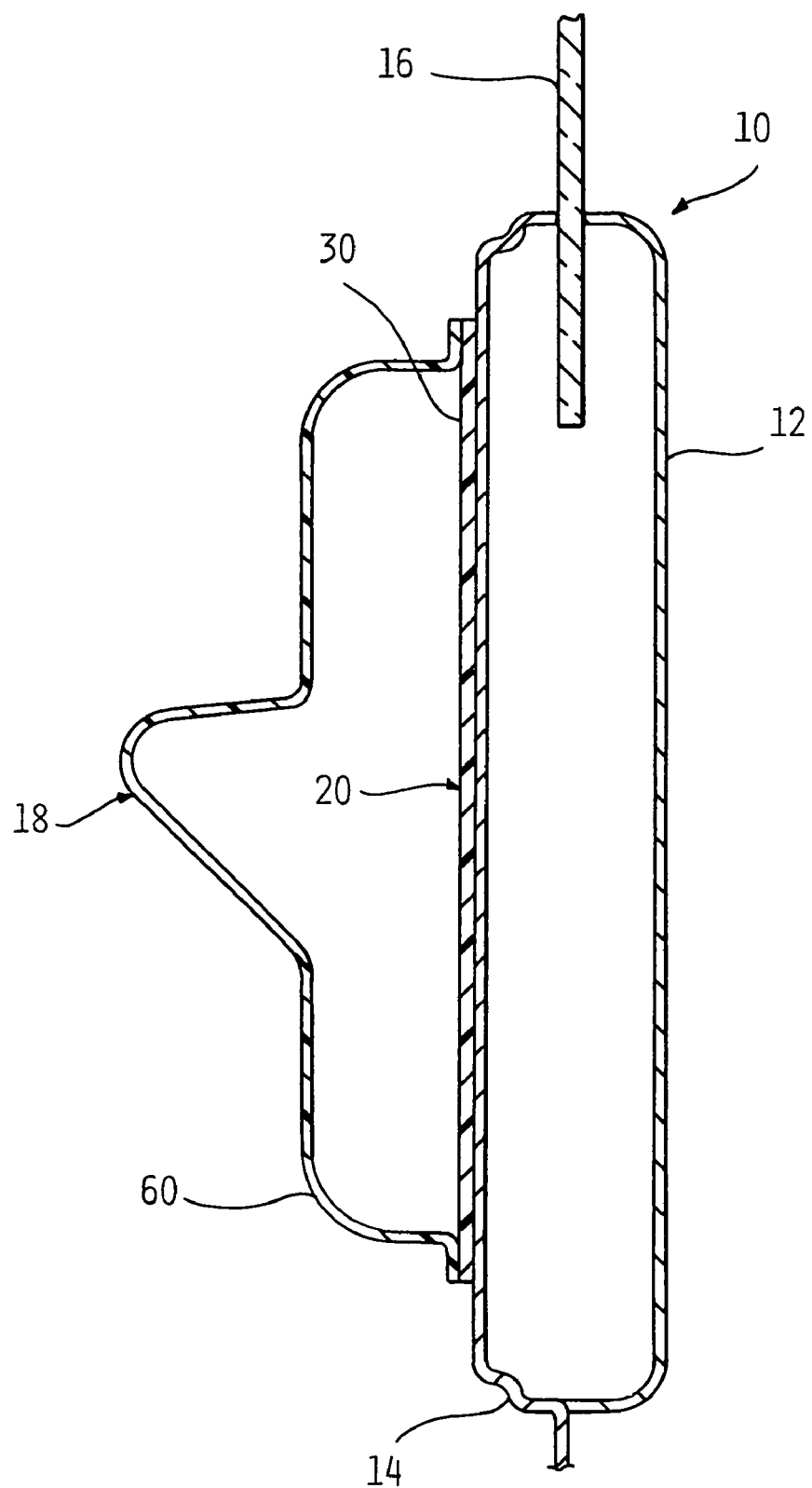
FIG. 1 is a cross sectional view of a vehicle door assembly incorporating a door watershield according to the present invention.

Referring to FIG. 1, the typical construction of a vehicle door will first be described by way of background to illustrate the advantageous use of the present door watershield.

A conventional vehicle door 10 includes an outer, typically sheet metal panel 12 which is joined at its peripheral edges to an inner, typically sheet metal panel 14. Central portions of the outer and inner panels 12 and 14 are spaced apart to define an opening to a hollow interior cavity formed between the spaced outer and inner panels 12 and 14. A glass window 16 is moveably mounted through the opening between the upper portions of the outer and inner panels 12 and 14 for movement into an out of the cavity between the outer and inner panels 12 and 14.

Although not shown in FIG. 1, conventional window regulator and door lock and/or mirror control elements are also mounted in the door cavity and connected to at least the lower portion of the window 16 and to door lock and mirror mechanisms, not shown, to control movements of the window, the door lock and the mirror in response to interior actuators usually mounted through an inner door trim panel 18. The inner door trim panel 18 is a three dimensional formed surface of various plastics, fabric or natural material combinations. The inner door trim panel 18 is mounted on the inner door panel 14 by means of hooks, fasteners or clips, not shown.

Figure 2:
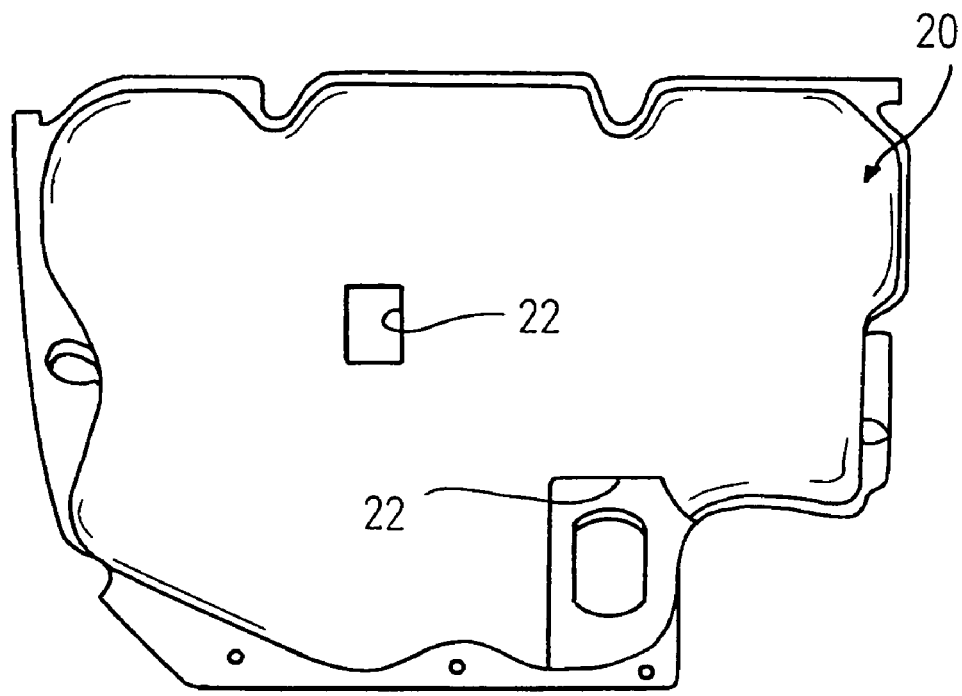
FIG. 2 is a plan elevational view of the door watershield shown in FIG. 1.
Figure 3:
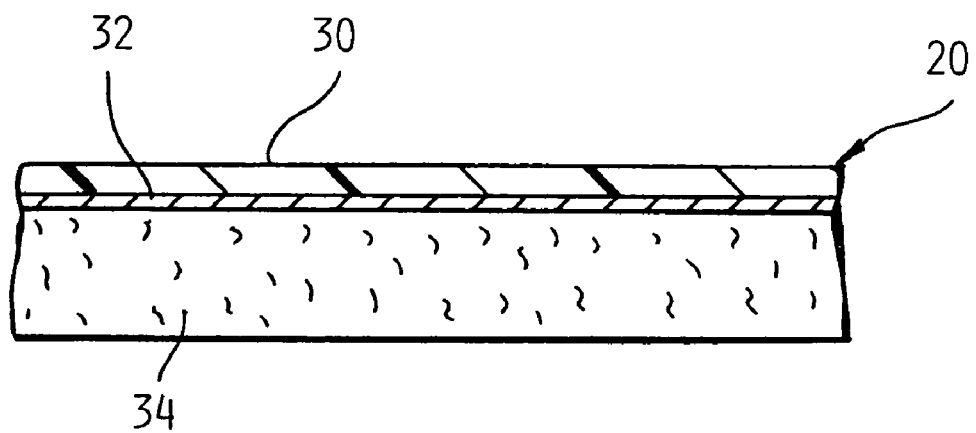
FIG. 3 is a cross sectional view of the door watershield of FIGS. 1 and 2.

According to the present invention, a door watershield or barrier 20 shown in FIGS. 1-3, can be mounted by means of a friction fit, RF welding, clips, or other suitable fasteners, not shown, to the inner surface of the door inner trim panel 18 or to the inner door panel 14 by means of adhesive, mechanical fasteners and combinations thereof, for example.

The door watershield 20 can be a flat sheet or formed with pockets, recesses and/or even apertures 22 shown in FIG. 2 to accommodate various hardware and actuators mounted externally and internally of the vehicle door 10.

The door shield 20 can also be formed, such as by various molding processes, into a formed three dimensional shape to accommodate projections, recesses, etc., in the door inner panel 14 or the door inner trim panel 18.

Referring now to FIG. 3, there is illustrated the detailed construction of the door shield 20. The door shield 20 includes a first layer 30 which faces the door inner panel 14 when the door shield 20 is mounted on the vehicle door 10 as shown in FIG. 1. The first layer 30 is formed of a hydrophobic, air restrictive but breathable face scrim material. For example, a scrim formed of polypropylene, non-woven material can be used for the first layer 30.

It is also known that the maximum absorbency benefit occurs when that facing layer is air permeable but yet also air restrictive. This invention further exploits both acoustic performance and water repellency through the use of a unique combination of a hydrophobic, air restrictive but breathable face scrim and a lofted non-woven fiber, as an automatic door watershield.

By example only, the first layer or scrim 30 can be a spunbond-meltdown-spunbond non-woven scrim (SMS) in which two spunbound layers encapsulate a meltblown layer of fibers. The two outside layers of the composite scrim 30 are spunbond in which continuous fibers are extruded and stretched to align the molecules in the fibers. This provides good tensile strength and good abrasion resistance. The meltblown inner layer of the scrim 30 provides water impermeability and air flow restriction. The meltblown process extrudes a large number of short, denier fibers. This structure allows only a restricted amount of air to pass while keeping out dust, dirt and fluids.

By example only, the first layer or scrim 30 may be bonded to the second layer pad or layer 34 by using a porous, heat activated adhesive web under heat and pressure, such as a low melt polyester adhesive web brand name PE 75-25 from Bostik Findlay.

Airflow permeability through the meltblown layer of the scrim 30 is dependent upon the orientation, diameter, thickness, and mass/area of fibers. In this manner, by varying the above parameters, the first layer or scrim 30 may be provided with an air permeability greater than zero which is tuned or optimized to a specific acoustic performance defined as a range of air permeabilities which maximize sound absorption in the desired acoustic frequency range. For example, a heavier basis weight of meltblown fiber or a thicker meltblown fiber layer in the scrim 30 will decrease airflow to assist in conjunction with the remaining elements of the shield 20 in absorbing low frequency sounds in the 500-5000 Hz range normally associated with road and tire noise.

The first layer 30 may be bonded to the second layer by various methods and materials, such as but not limited to, adhesive 32, such as a thermal hot air or flame, ultrasonic, or Rf welding, heated plates or pressure. The bonding process and materials used to bond the first layer 30 to the second layer 34 must not impact air permeability to such an extent that it diminishes the desired acoustic benefits of the door watershield.

The second layer 34 is normally disposed on one side of the first layer 30 facing the inside of the vehicle passenger compartment, or the door inner trim panel 18, as shown in FIG. 1.

The second layer 34 is a lofted, polymeric fiber, such as polyester or polypropylene, non-woven pad, natural fiber pad such as a cotton pad, or and open celled polymeric foam pad. For example, the second layer 34 can be formed of a lofted polyester non-woven fiber pad. Such a pad 34 can increase acoustic performance by absorbing or attenuating a wide frequency range of sound by merely increasing the thickness of the layer 34. Further, the use of a lofted polyester non-woven fiber pad for the layer 34 provides a pad which does not absorb or wick fluid. Further, the pad or layer 34 can be easily compressed for zero clearance areas between the door inner trim panel 18 and the door inner panel 14.

Thus, the door shield 20 formed primarily of the first and second layers 30 and 34, as described above, can be provided with a targeted acoustic performance, such as one particularly suited to attenuate or absorb a wide range of sounds or noise associated with a vehicle, such as low frequency road and tire noise in the 500-5000 Hz frequency range up to a 20,000 Hz brake squeal. This can be attained by optimizing the orientation, diameter, thickness, and mass/area of fibers of both the first and second layers 30 or 34.

A chemical low surface tension coating or wetting agent, such as a Scotchguard coating sold by 3M, various fluorocarbons, fluorosilicones and silicones, can be applied to the outer surface of the first layer 30 to increase the hydrophobicity of the first layer 30 while still providing targeted air permeability greater than zero through the first layer 30.

In conclusion, there has been disclosed an air permeable, water repellent, acoustic door watershield which blocks water and dirt from entry into a vehicle passenger compartment while at the same time providing tuned or targeted air permeability to attenuate vehicle component generated noise and external noise from entering the passenger compartment.

This invention further exploits both acoustic performance and water repellency through the use of a unique combination of a hydrophobic, air restrictive but breathable face scrim and a lofted non-woven fiber, as an automotive door watershield.

What is claimed is:

1. An acoustically active watershield mountable on an automotive vehicle door in an interior cavity defined therein, the watershield comprising:

a first layer having a first surface and a second surface, the first surface configured to be oriented to face an outwardly oriented panel of the automatic vehicle door, the first layer composed of a hydrophobic, air restrictive, fluid repellant scrim;

a second layer in laminated relationship to the second face of the first layer, the second layer having a first face in laminated contact with the first layer and an opposed second face, the second layer composed of one of an open-cell foam or a lofted fiber material.

2. The acoustically active watershield of claim 1 wherein the second layer is formed of at least one of a lofted polymeric fiber pad, a natural fiber pad, or an open-celled polymeric foam pad.

3. The vehicle door watershield of claim 2 wherein the hydrophobic, air-restrictive, fluid-repellant scrim comprises:

at least one layer of meltblown polymeric fiber and at least one layer of spunbonded polymeric fibers.

4. The vehicle door watershield of claim 2 wherein the scrim comprises:

a polymeric apertured film.

5. The vehicle door watershield of claim 2 wherein the lofted fiber pad of the second layer comprises one of polymeric and natural fibers.

6. The vehicle water door shield of claim 2 wherein the first layer has an air permeability greater than zero.

7. The vehicle door watershield of claim 2 wherein the second layer has an air permeability and wherein the air permeability of the first layer is coordinated with the air permeability of the second layer to optimize sound absorption frequencies.

8. The vehicle door watershield of claim 2 wherein the first layer comprises a chemical low surface tension coating agent.

9. The vehicle door watershield of claim 8 wherein the chemical low surface tension agent comprises:

at least one of a fluorocarbon, fluorosilicone and silicone.

10. The vehicle door watershield of claim 2 wherein:

the first layer is formed as a spunbond-meltblown-spunbound tri-laminate.

11. The acoustically active watershield of claim 1 wherein the scrim comprises at least one of spunbound nonwoven fibers and melt-blown nonwoven fibers.

12. The acoustically active watershield of claim 11 wherein the scrim comprises at least one of spun-bond nonwoven fibers and melt-blown nonwoven fibers.

13. The acoustically active watershield of claim 12 wherein the scrim comprises at least one layer of spun-bond nonwoven fibers and at least one layer of melt-blown nonwoven fibers.

14. The acoustically active watershield of claim 13 wherein the fibers are positioned relative to one another in a manner sufficient to block passage of at least one of dust, dirt, and fluids, but permit a restricted amount of air to pass from the first face to the second face, air passage dependent on at least one of orientation, diameter, thickness, mass, or area of the fibers.

15. The acoustically active watershield of claim 14 wherein the first layer comprises heavier basis weight fibers configured to assist in absorbing lower frequency sounds.

16. The acoustically active watershield of claim 1 further comprising a porous adhesive interposed between the first layer and the second layer.

17. The acoustically active watershield of claim 16 wherein the porous adhesive is an adhesive web.

18. The acoustically active water-shield of claim 1 wherein the material of the first layer is different from the material of the second layer.

19. A vehicle door assembly comprising:

an outwardly oriented panel;

an inwardly oriented panel;

an interior trim panel overlaying the inwardly oriented panel; and a vehicle door shield positioned between the inwardly oriented panel and the interior trim panel, the vehicle door shield consisting of an inwardly oriented layer composed of a lofted fiber pad and an outwardly oriented layer formed of a non-woven breathable, hydrophobic, fluid-repellant scrim, in laminated contact thereto, wherein the vehicle door shield has an inwardly oriented surface formed from the lofted fiber pad.

* * * * *